(12) United States Patent
Funakoshi et al.

(10) Patent No.: US 7,649,814 B2
(45) Date of Patent: Jan. 19, 2010

(54) OPTICAL PICKUP

(75) Inventors: Hideaki Funakoshi, Osaka (JP); Hiroki Nakamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 729 days.

(21) Appl. No.: 10/761,386

(22) Filed: Jan. 22, 2004

(65) Prior Publication Data

US 2004/0151085 A1 Aug. 5, 2004

(30) Foreign Application Priority Data

Jan. 23, 2003 (JP) .................. 2003-000307 U

(51) Int. Cl.
*G11B 7/095* (2006.01)

(52) U.S. Cl. ................. 369/44.16; 369/44.23

(58) Field of Classification Search ............ 369/47.31, 369/44.16, 44.15; 720/682–687; 359/814, 359/824
See application file for complete search history.

(56) References Cited

U.S. PATENT DOCUMENTS

| | | | | |
|---|---|---|---|---|
| 5,748,580 A | * | 5/1998 | Matsui | 369/44.16 |
| 6,069,867 A | * | 5/2000 | Ikegame | 369/248 |
| 6,285,517 B1 | * | 9/2001 | Uekusa et al. | 359/813 |
| 6,342,978 B1 | * | 1/2002 | Nishikawa et al. | 359/813 |
| 2003/0012090 A1 | * | 1/2003 | Kawano | 369/44.16 |
| 2003/0016597 A1 | * | 1/2003 | Haruguchi et al. | 369/44.16 |
| 2003/0067848 A1 | * | 4/2003 | Kabasawa et al. | 369/44.16 |
| 2003/0161252 A1 | * | 8/2003 | Sugawara | 369/244 |
| 2003/0198148 A1 | * | 10/2003 | Choi | 369/44.16 |

FOREIGN PATENT DOCUMENTS

| | | |
|---|---|---|
| JP | 07-050023 | 2/1995 |
| JP | 2002-298402 | 10/2002 |
| JP | 2002-342962 | 11/2002 |

OTHER PUBLICATIONS

English Translation JP2002-298402 NaKamura Toshio Oct. 11, 2002.*

* cited by examiner

*Primary Examiner*—Wayne R Young
*Assistant Examiner*—Van N Chow
(74) *Attorney, Agent, or Firm*—Morgan Lewis & Bockius LLP

(57) ABSTRACT

An optical pickup has a lens that is resiliently supported in such a manner as to be displaceable in different directions by pairs of a first wire, a second wire, and a third wire which are attached to a fixing portion by attaching means. The optical pickup includes a lens holder for holding the lens, and a printed circuit board secured to the lens holder. The first, second, and third wires have the same length and are formed of the same material, and are soldered to the printed circuit board at different distances from the attaching means.

2 Claims, 2 Drawing Sheets

OPTICAL PICKUP

BACKGROUND OF THE INVENTION

1. Field of the Invention

The present invention relates to an optical pickup mounted in an optical disk drive, and more particularly to a structure for supporting a lens provided in the optical pickup.

2. Description of the Related Art

An optical pickup mounted in an optical disk drive has a lens for focusing laser light onto a disk, and is provided with a drive mechanism for adjusting the tracking position and the focusing position of the lens in correspondence with the surface vibration and eccentricity of a disk. A conventional lens driving mechanism is disclosed in JP-A-7-50023 (pages 2 to 5, FIG. 1).

In this lens driving mechanism, the lens is held by a lens holder, a plurality of pairs of wires are provided to bridge the lens holder and a fixing portion which is fixed to the optical pickup, so as to support both side surfaces of the lens holder. Focusing coils and tracking coils are connected to the respective pairs of wires, magnets respectively opposing these coils are provided.

Consequently, if the respective coils are energized through the wires, electromagnetic forces are generated to allow the lens holder to move in a predetermined direction. Accordingly, it becomes possible to effect the tracking and focusing of the lens in correspondence with the drive current.

At this time, if the wire connected to the focusing coil and the wire connected to the tracking coil have the same spring constant, torsional resonance occurs. For this reason, the wires of the respective pairs are formed with different lengths so as to prevent the torsional resonance.

However, according to the above-described conventional optical pickup, the kinds of parts increase since the respective pairs of wires have different lengths. In particular, the kinds of parts further increase in a case where adjustment of not only the focusing and tracking directions but also such as the tiling direction of the lens is also carried out. For this reason, the wire management cost and the inventory cost become high, and the assembly operation becomes complex since the wires of plurality of lengths are present in mixed form. Accordingly, there has been a problem in that the cost of manufacturing the optical pickups increases.

In addition, wires of different spring constants are required for each model in order to obtain optimal operation of the optical pickup. For this reason, there has been another problem in that the kinds of wire further increase, so that the management cost and inventory cost become high.

SUMMARY OF THE INVENTION

An object of the invention is to provide an optical pickup which makes it possible to reduce the cost.

To attain the above object, according to the invention, there is provided an optical pickup including: a lens holder holding a lens; a substrate secured to the lens holder; a fixing portion; three pairs of first, second and third wires, each pair being formed by two left and right wires; and attaching means; wherein the lens holder is resiliently supported in such a manner as to be displaceable by the three pairs first, second and third wires which are attached to the fixing portion by the attaching means; and the first, second, and third wires have the same length and are formed of the same material, and are soldered to the substrate at different distances from the attaching means.

According to this construction, the lens is supported by the first, second, and third wires whose one ends are fixed to the fixing portion by the attaching means. As a drive current is allowed to flow to the first, second, and third wires, for example, the focusing, tracking, and tilt adjustment of the lens is carried out. The first, second, and third wires consist of members formed with the same length and the same material, and are fixed to the lens at different distances from the fixing portion. Therefore, these wires have optimum spring constants corresponding to the directions of displacement.

In addition, according to the invention, there is provided an optical pickup including: a lens; a fixing portion; at least two pairs of wires; and attaching means; wherein the lens is resiliently supported in such a manner as to be displaceable by the at least two pairs of wires which are attached to the fixing portion by the attaching means; and the wires have the same length and are fixed to the lens at different distances from the attaching means.

According to this construction, the lens is supported by the respective pairs of wires whose one ends are fixed to the fixing portion by the attaching means. As a drive current is allowed to flow to the wires, for example, focusing, tracking, and tilting of the lens is carried out. The wires consist of members of the same length, and are fixed to the lens at different distances from the fixing portion. Therefore, these wires have optimum spring constants corresponding to the directions of displacement.

In the optical pickup having the above-described construction, the wires may be formed of the same material.

In addition, in the optical pickup may include: a lens holder holding the lens; and a substrate secured to the lens holder; wherein the wires are soldered to the substrate. According to this construction, the lens holder is supported by soldering the wires to the substrate.

In addition, in the optical pickup, the substrate may have a plurality of soldering lands which are juxtaposed in a direction in which at least one of the wires extends. According to this construction, as the wires are soldered to soldering lands which differ in correspondence with the kinds of the optical pickup, it is possible to obtain optimum spring constants for each kind of the optical pickup.

In addition, the optical pickup may include: a lens holder holding the lens and having a plurality of groove portions formed on both side surfaces of the lens holder and are parallel to each other; wherein the wires inserted in the groove portions are fixed at predetermined positions by an adhesive agent.

DETAILED DESCRIPTION OF THE PREFERRED EMBODIMENTS

Figure 1:
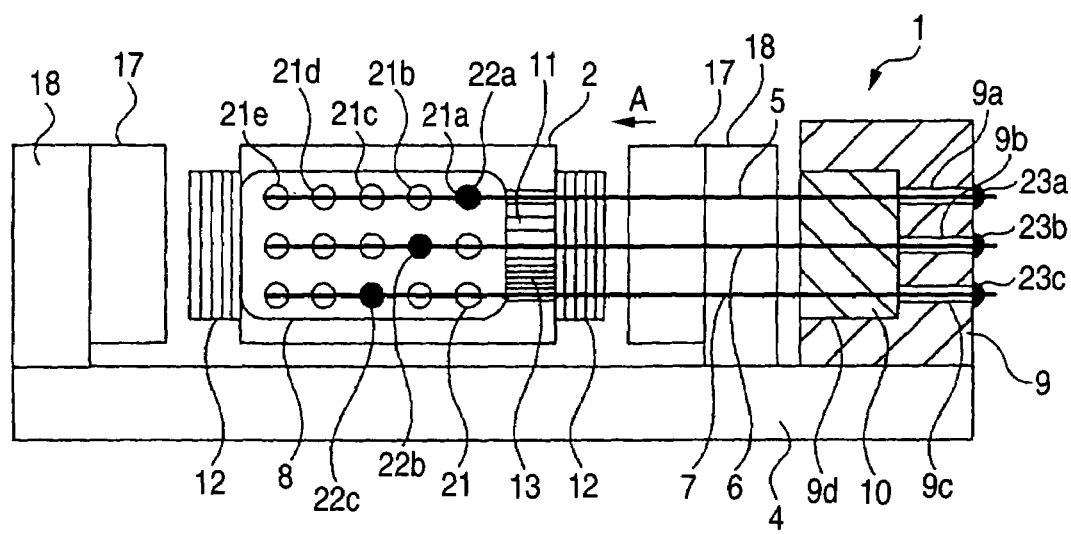
FIG. 1 is a side elevational and partially sectional view illustrating an optical pickup according to an embodiment of the invention.

Hereafter, a description will be given of an embodiment of the invention with reference to the drawings. FIG. 1 is a side elevational view illustrating an optical pickup in accordance with an embodiment. In an optical pickup 1, a fixing portion 9 is provided on a base 4 that is mounted on an optical disk drive. The fixing portion 9 has a U-shaped cross section, and through holes 9a, 9b, and 9c are formed therein.

First, second, and third wires 5, 6, and 7 are inserted in the through holes 9a, 9b, and 9c, and one ends of the first, second, and third wires 5, 6, and 7 are soldered to the fixing portion 9 by solder 23a, 23b, and 23c. A gel-like cushioning material 10 for damping the vibration of the first, second, and third wires 5, 6, and 7 is filled in a recessed portion 9d of the fixing portion 9.

Figure 2:
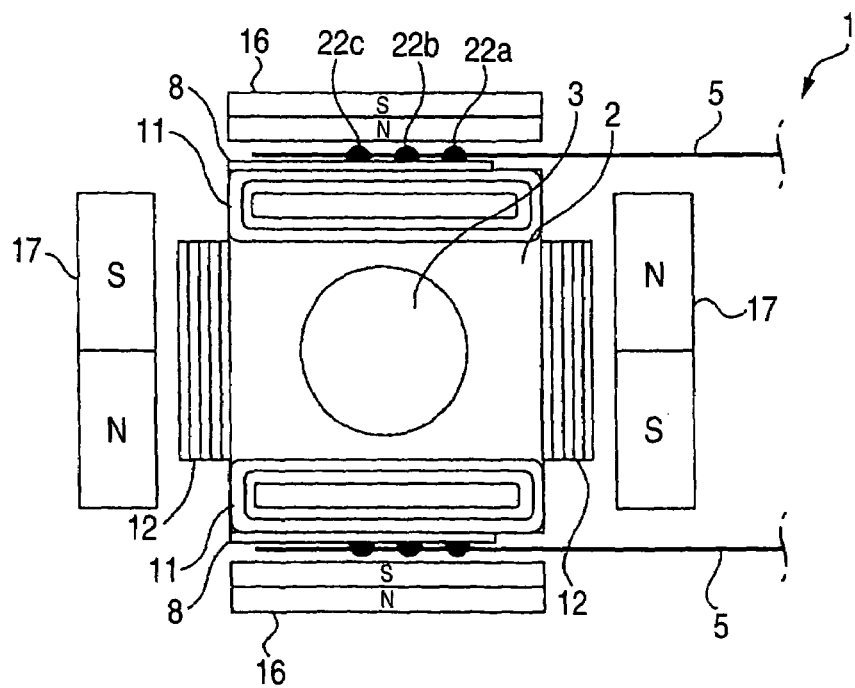
FIG. 2 is a top view illustrating the optical pickup.
Figure 3:
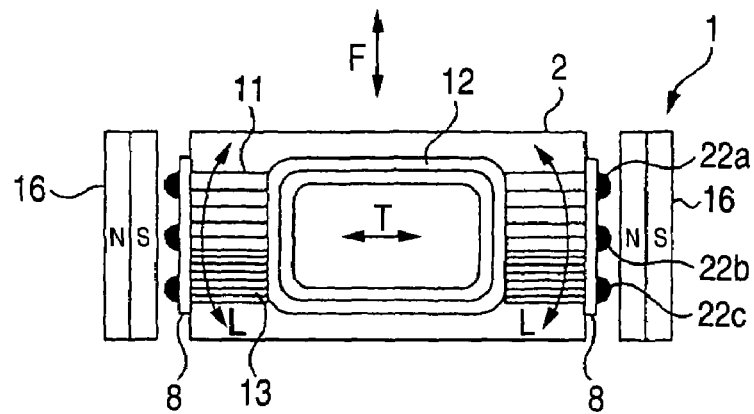
FIG. 3 is a view taken in the direction of arrow A in FIG. 1.

A lens holder 2 is disposed in a direction in which the first, second, and third wires 5, 6, and 7 extend. FIG. 2 shows a top view of the lens holder 2 and its vicinities, and FIG. 3 shows a view taken in the direction of arrow A in FIG. 1. The lens holder 2 holds a lens 3 for focusing a light beam, and the first, second, and third wires 5, 6, and 7 are provided in two sets on both side surfaces of the lens holder 2.

A pair of focusing coils 11 are respectively wound on both side portions of the lens holder 2, and a pair of tilt adjusting coils 13 are wound below the focusing coils 11. Each of a pair of magnets 16, which are fixed to the base 4 by supporting plates (not shown), is disposed in such a manner as to oppose the focusing coil 11 and the tilt adjusting coil 13.

A pair of tracking coils 12 are respectively wound on a front and a rear portion of the lens holder 2. Each of a pair of magnets 17, which are fixed to the base 4 by supporting plates 18 (see FIG. 1), is disposed in such a manner as to oppose the tracking coil 12. The focusing coils 11, the tilt adjusting coils 13, and the tracking coils 12 on both side surfaces of the lens holder 2 are respectively connected to a pair of printed circuit boards 8 bonded to both side surfaces of the lens holder 2.

A plurality of lands 21 for soldering are provided on the printed circuit boards 8. The first, second, and third wires 5, 6, and 7 are respectively soldered by the solder 22a, 22b, and 22c at the predetermined lands 21. Consequently, the lens holder 2 is resiliently supported by the fixing portion 9 in such a manner as to be displaceable.

When a drive current is applied to the first, second, and third wires 5, 6, and 7, electromagnetic forces are generated in the focusing coils 11, the tracking coils 12, and the tilt adjusting coils 13. As a result, the lens holder 2 can be moved in the directions of arrows F, T, and L (see FIG. 3) by the focusing coils 11, the tracking coils 12, and the tilt adjusting coils 13, thereby making it possible to effect the focusing, tracking, and tilt adjustment o the lens 3.

The lands 21 provided on the printed circuit board 8 are juxtaposed in the direction in which the first, second, and third wires 5, 6, and 7 extend. For example, lands 21a to 21e are provided in a juxtaposed manner in parallel with the first wire 5, and the first wire 5 is soldered to the land 21a closest to the fixing portion 9 side. Similarly, the second wire 6 is soldered to the second land from the fixing portion 9 side, while the third wire 7 is soldered to the third land from the fixing portion 9 side.

For this reason, the first, second, and third wires 5, 6, and 7 are respectively fixed at different distances from the attaching portions (23a, 23b, and 23c) of the fixing portion 9. As a result, the lens holder 2 can be resiliently supported with mutually different spring constants by the first, second, and third wires 5, 6, and 7 formed of the same material and with the same length. Accordingly, it is unnecessary to use wires of different lengths, so that parts management cost and inventory cost can be reduced by decreasing the kinds of parts, and the assembly of the optical pickup 1 can be effected easily.

In addition, since the lands 21a to 21e of the printed circuit board 8 are juxtaposed, the lens holder 2 can be resiliently supported with optimum spring constants in correspondence with the kinds of the optical pickup 1 by making the lands to be soldered variable. Consequently, it is unnecessary to provide different printed circuit boards and wires in correspondence with the models, and it is possible to further decrease the kinds of parts. It should be noted that it is possible to use different printed circuit boards on which lands are formed at predetermined positions for each type of the optical pickup.

Figure 4:
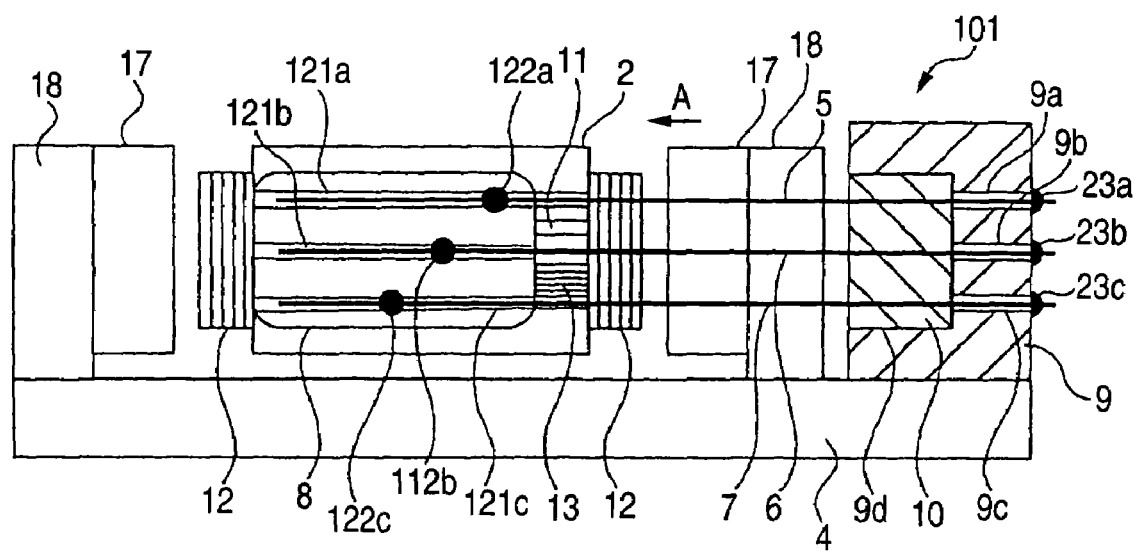
FIG. 4 is a side elevational and partially sectional view illustrating an optical pickup according another embodiment of the invention.

Although in this embodiment the first, second, and third wires 5, 6, and 7 are soldered, these wires may be fixed by an adhesive agent. For example, as shown in FIG. 4, three parallel groove portions 121a, 121b and 121c are formed in each of both side surfaces of the lens holder 2, and the first, second, and third wires 5, 6, and 7 inserted in the respective groove portions 121a, 121b and 121c are fixed at predetermined positions by an adhesive agent 122a, 122b and 122c. Then, ends of the first, second, and third wires 5, 6, and 7 are connected to the respective coils 11 to 13. As a result, the adhesive agent 122a, 122b and 122c is filled in the groove portions 121a, 121b and 121c, thereby making it possible to firmly secure the first, second, and third wires 5, 6, and 7.

Although the lens holder 2 is supported by the first, second, and third wires 5, 6, and 7 provided in three pairs, it is possible to obtain a similar effect in an optical pickup in which the lens holder 2 is supported by two pairs of wires or more than three pairs of wires.

In addition, portions of the first, second, and third wires 5, 6, and 7 may be fixed to the lens holder 2 at the same distance from the attaching portions. For example, the first and second wires 5 and 6 may be fixed to the lens holder 2 at different distances from the attaching portions (23a, 23b), and the second and third wires 6 and 7 may be fixed to the lens holder 2 at the same distance from the attaching portions (23b, 23c).

According to the invention, the first, second, and third wires are formed with the same length and of the same material, and are soldered to the substrate at different distances from the attaching means of the fixing portion. Therefore, the lens holder can be resiliently supported with different spring constants by the first, second, and third wires formed with the same length and of the same material. Accordingly, it is unnecessary to use wires of different lengths, so that parts management cost and inventory cost can be reduced by decreasing the kinds of parts, and the assembly of the optical pickup can be effected easily. Hence, it is possible to reduce the cost of the optical pickup.

In addition, according to the invention, at least two pairs of wires are formed with the same length, and are fixed to the lens at different distances from the attaching means. Therefore, the lens can be resiliently supported with different spring constants by the wires of the same length. Accordingly, it is unnecessary to use wires of different lengths, so that parts management cost and inventory cost can be reduced by decreasing the kinds of parts, and the assembly of the optical pickup can be effected easily. Hence, it is possible to reduce the cost of the optical pickup.

In addition, according to the invention, the lens holder for holding the lens and the substrate which is fixed to the lens holder are provided, and the wires are soldered to the substrate. Therefore, the wires can be fixed easily at different distances from the attaching means.

In addition, according to the invention, the substrate has a plurality of soldering lands which are juxtaposed to extend in a direction in which at least one of the wires extends. Therefore, the lens holder can be resiliently supported with optimum spring constants in correspondence with the kinds of the optical pickup by making the lands to be soldered variable. Consequently, it is unnecessary to provide different printed circuit boards and wires in correspondence with the models, and it is possible to further decrease the kinds of parts.

In addition, according to the invention, since the wires inserted in the groove portions provided in the lens holder for holding the lens are bonded at predetermined positions, the wires can be fixed easily at different distances from the attaching means.

What is claimed is:

1. An optical pickup comprising:
   a lens;
   a fixing portion;
   at least two pairs of wires; and
   attaching means;
   wherein the lens is resiliently supported in such a manner as to be displaceable by the at least two pairs of wires which are attached to the fixing portion by the attaching means; and
   the wires have the same length and are fixed to the lens at different distances from the attaching means; and
   further comprising:
   a lens holder holding the lens; and
   a substrate secured to the lens holder;
   wherein the wires are soldered to the substrate; and,
   wherein the substrate has a plurality of soldering lands which are juxtaposed in a direction in which at least one of the wires extends.

2. An optical pickup comprising:
   a lens;
   a fixing portion;
   at least two pairs of wires; and
   attaching means;
   wherein the lens is resiliently supported in such a manner as to be displaceable by the at least two pairs of wires which are attached to the fixing portion by the attaching means; and
   the wires have the same length and are fixed to the lens at different distances from the attaching means; and,
   further comprising:
   a lens holder holding the lens and having a plurality of groove portions formed on both side surfaces of the lens holder and are parallel to each other;
   wherein the wires inserted in the groove portions are fixed at predetermined positions by an adhesive agent.

* * * * *